United States Patent [19]

Vartanian

[11] Patent Number: 5,085,555
[45] Date of Patent: * Feb. 4, 1992

[54] SPRING BIASED VEHICLE ACCESS RAMP

[76] Inventor: Roger Vartanian, Box 64, Saw Creek Estates, East Stroudsburg, Pa. 18322

[*] Notice: The portion of the term of this patent subsequent to Oct. 30, 2007 has been disclaimed.

[21] Appl. No.: 554,705

[22] Filed: Jul. 18, 1990

Related U.S. Application Data

[63] Continuation of Ser. No. 275,276, Nov. 23, 1988, Pat. No. 4,966,516.

[51] Int. Cl.⁵ .............................................. B60P 1/44
[52] U.S. Cl. ...................................... 414/537; 14/71.1; 296/51; 414/921
[58] Field of Search ................... 414/537, 538; 296/51, 296/61; 49/247; 14/69.5, 71.1; 267/155

[56] References Cited

U.S. PATENT DOCUMENTS

| | | | |
|---|---|---|---|
| 456,601 | 7/1891 | Sherwin | 14/71.1 |
| 2,527,653 | 10/1950 | Pierce | 14/71.1 |
| 2,767,735 | 10/1956 | Darling | 267/155 X |
| 2,890,477 | 6/1959 | Miller | 267/155 X |
| 3,288,522 | 11/1966 | Norton | 296/61 |
| 3,319,811 | 5/1967 | Martin, Jr. | 414/537 |
| 3,861,739 | 1/1975 | Kinney | 414/537 X |
| 3,972,428 | 8/1976 | Love, Jr. et al. | 296/61 X |
| 4,084,713 | 4/1978 | Rohrs et al. | 414/537 |
| 4,285,676 | 8/1981 | Kraft | 267/155 X |
| 4,657,233 | 4/1987 | Vroom | 414/537 X |
| 4,691,956 | 9/1987 | Hodge | 296/51 |
| 4,966,516 | 10/1990 | Vartanian | 414/537 |

Primary Examiner—David A. Bucci
Attorney, Agent, or Firm—Eckert, Seamans, Cherin & Mellott

[57] ABSTRACT

A vehicle access ramp especially for wheel chair access includes alternative horizontal and vertical pivot assemblies. A foldable ramp is pivotably attached to a horizontal axis hinge, and vertically pivotable around a vertical rod at a side of a doorway. For deployment to the ground, the ramp is pivoted horizontally and unfolded. To provide access to the doorway without use of the ramp, the folded ramp is locked into its stored vertical position in the vehicle and pivoted or swung out of the way on a vertical pivot assembly in the vehicle doorway.

10 Claims, 4 Drawing Sheets

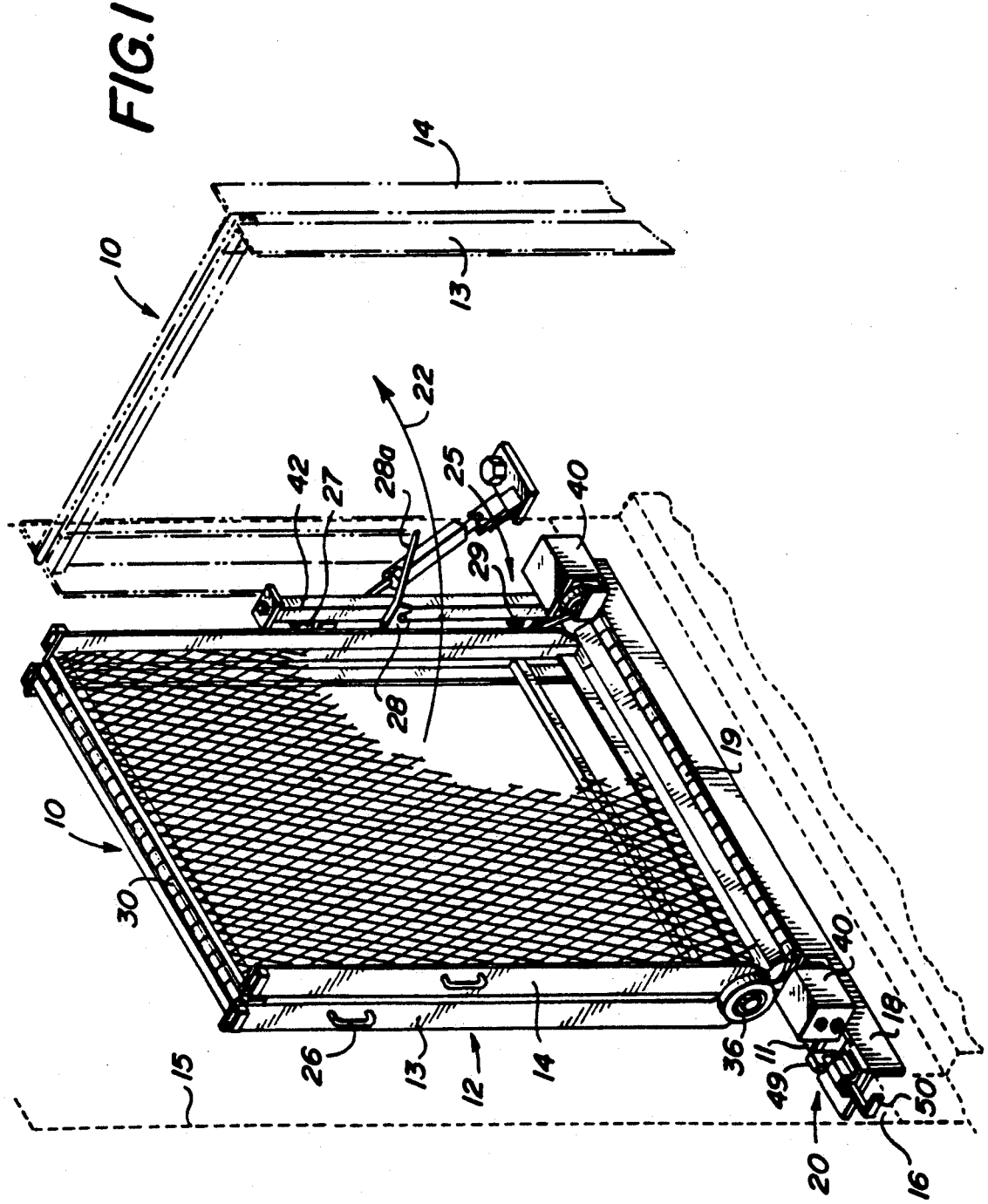

SPRING BIASED VEHICLE ACCESS RAMP

CROSS REFERENCE TO RELATED APPLICATIONS

This is a continuation of application Ser. No. 275,276, filed Nov. 23, 1988, now U.S. Pat. No. 4,966,516.

BACKGROUND OF THE INVENTION

1. Field of the Invention

This invention relates to ramps and more particularly to a foldable vehicle wheel chair ramp which can be deployed, swung out of the way, and stowed in a vehicle, by means of a ramp mounting with mutually perpendicular alternative pivot axes.

2. Description of the Prior Art

There are many possibilities known for ramps and lifts to enable wheel chair users to traverse obstacles such as vertical steps. However, the ramps and lifts are very substantial structures and in themselves present obstacles to others. Permanent ramps and lifts are known for buildings and stowable ones are known for intermittent use, such as for entering or leaving a vehicle. In vehicles, a common means of access to and from the vehicle has been a motorized lift. The occupied wheel chair is rolled onto a platform associated with the lift and the lift then moves the platform and chair from the current position to the desired position so that the chair can be rolled off the platform and either into the vehicle or onto the ground. The platform is stowed across the doorway or the platform is defined by the door panel itself.

Ramps are also used with vehicles, some permanently affixed to the vehicle and some portable. One permanently installed access ramp is disclosed in U.S. Pat. No. 3,874,527 to Royce. The invention in Royce modifies the door of the vehicle so that the door is hingeably connected to the floor of the vehicle, and is thus similar to a lift but is stationary when deployed. The door opens outward and downward to rest its top edge on the ground. The door inside wall is a durable material for use as a ramp surface. Where a ramp corresponds in length only to the height of a door, the ramp may define a relatively steep angle when deployed. A great deal of physical effort may be required to propel a wheelchair up such a short, steep ramp.

Ramps similar to Royce's door ramp also are added to vehicles at their doorways, being separate from the door. When stowed, these vehicle access ramps fold up behind the door but thereby block the doorway, making it impossible for another person, whether a wheel chair user or not, to use the door unless the ramp is lowered. An example of such a ramp is disclosed in U.S. Pat. No. 4,084,713 to Rohrs et al. Rohrs shows a vehicle wheelchair ramp mounted on a horizontal hinge axis at the floor of the vehicle and unfolding outwardly from the vehicle. The ramp has two panels hinged at a knuckle, the deployed ramp being about twice as long as the door is high. When not in use, the ramp is folded and stowed vertically in the doorway. This folded-double form of ramp, of course, is that much more of an obstruction across the doorway.

There is a need for a vehicle access ramp which can function in the manner of ramps of the type stowed in doorways, preferably including plural folded panels, but does not block the doorway when stowed. For this purpose the ramp of the invention has alternative pivot axes, namely, a horizontal pivot used to deploy the ramp downwardly to the ground for wheelchair access, and also a vertical pivot which allows the stowed ramp to be swung out of the doorway for providing access to the doorway of the vehicle.

SUMMARY OF THE DISCLOSURE

The vehicle access ramp of this invention combines easy deployment with a convenient swing-out feature for free access to the vehicle doorway when the ramp is not being used. The vehicle access ramp is composed of one or more hinged ramp sections or panels, for example two sections connected at a knuckle that permits the sections to fold, or when unfolded locks the sections in co-linear alignment. The ramp unfolds on a horizontal pivot axis connected to a movable plate, lockable at the lower edge of the doorway such that the ramp defines an incline from the lower edge of the doorway to the ground. The ramp is retracted by folding the hinged segments up into the doorway where initially they are vertically disposed and block the doorway. In this position, means are provided for fixing the ramp sections in a secure vertical orientation.

The access ramp can be disengaged from the lower edge of the doorway by unlocking the movable plate, whereupon the ramp sections and movable plate are rotated as a unit on a second pivot axis which allows the ramp to be pivoted and stowed out of the doorway opening. Preferably, the second pivot axis is defined by an adjustable post disposed vertically at one side of the doorway such that the stowed ramp can be hingeably swung in or out to clear the doorway, in a manner similar to the hinge of a vehicle door, permitting easy unobstructed access to the vehicle.

It is, therefore, an object of this invention to provide a vehicle access ramp with alternative pivots for arranging the ramp in different positions as needed for deployment, doorway access and storage, respectively.

It is another object of this invention to provide a vehicle access ramp which swings out of the doorway to provide clear access to the door when the ramp is not in use.

It is further object of this invention to provide a vehicle access ramp which has at least two hingeably connected ramp sections foldable around a knuckle and means for securing the ramp sections to one another and to the vehicle doorway, as necessary for deployment, for stowing and/or non-deployed rotation to a vehicle access position clear of the doorway.

It is yet another object of this invention to provide a vehicle access ramp which will not interfere with seating in the vehicle adjacent to the stowed ramp.

It is still another object of this invention to provide a vehicle access ramp which is mountable conveniently in full size vans or mini vans.

It is yet a further object of this invention to provide a vehicle access ramp which is shiftable from its storage or access position to a position ready for deployment with the release of a single latch, while retaining durable structural connections.

It is another object of this invention to provide a vehicle access ramp which requires minimal modification of the vehicle itself.

These and other objects will be more readily ascertainable to one skilled in the art from a consideration of the following figures, description and exemplary embodiments, with the understanding that the drawings are illustrative only and that changes may be made in the specific construction illustrated and described within the scope of the appended claims.

BRIEF DESCRIPTION OF THE DRAWINGS

FIG. 1 is a perspective view of the ramp of this invention, the ramp folded and stored in its stored position across the opening of a vehicle doorway (viewed from outside the vehicle), the alternative swing-out access position being shown in phantom, and the doorway of the vehicle also being shown in phantom.

DETAILED DESCRIPTION OF THE PREFERRED EMBODIMENTS

Figure 3:
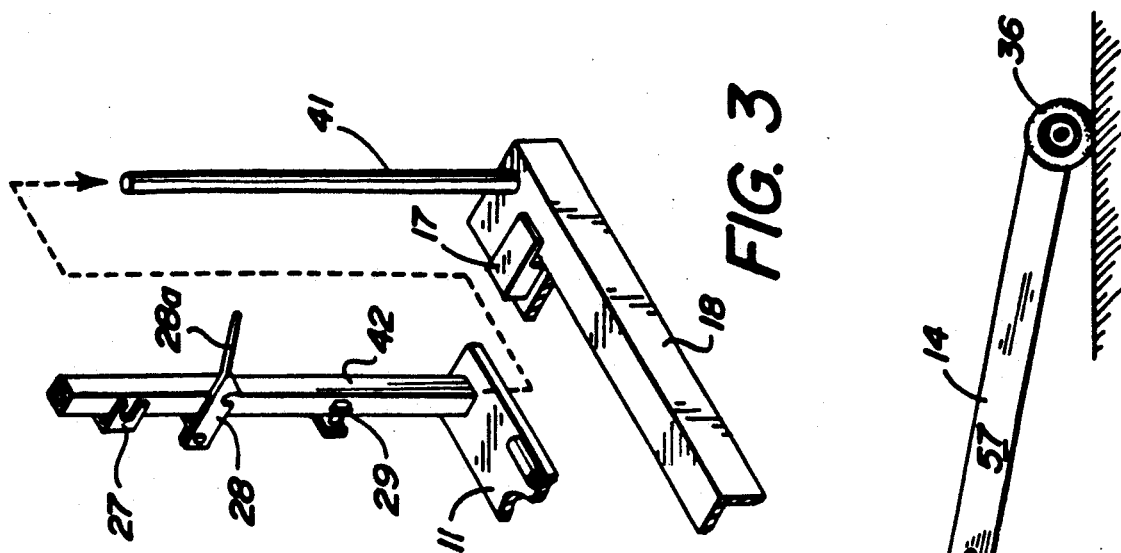
FIG. 3 is an exploded view of the vertical pivot assembly of this invention.
Figure 2:
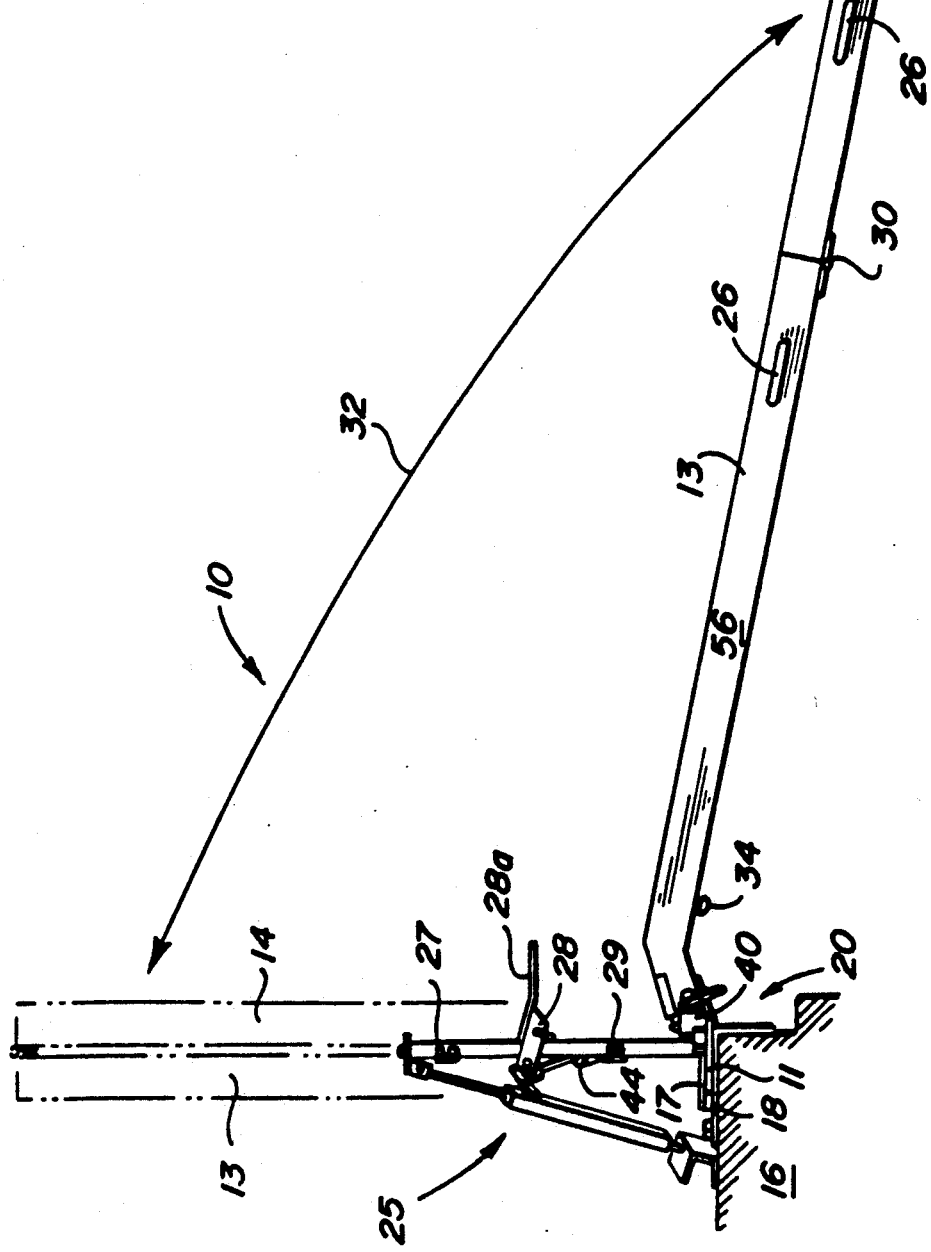
FIG. 2 is a side view illustrating the deployed ramp and the vertical pivot axis assembly.

Referring now to the drawings, and more particularly to FIGS. 1 to 3, wheel chair access ramp 10 is positioned in vehicle doorway 15 on the edge of floor 16 thereof. The device has ramp member 12, comprising a movable plate 11 connected to the deployable ramp sections by means of a heavily spring-biased hinge 19. Plate 11 is lockable to a base plate 18, attached to the vehicle doorway. The ramp member 12 has first ramp panel or section 13, and a second ramp panel or section 14, connected together by a knuckle 30. When ramp member 12 is either stowed or deployed, first ramp panel 13 is hingeably attached relative to base plate 18 along the lower edge of the doorway opening by spring biased mounting means 40, hinge 19 and movable plate 11, which is locked to base plate 18 in these positions. In the access position, however, movable plate 11 is unlocked from base plate 18, whereupon both hinge leaves 21,23 of hinge 19 can be pivoted away from base plate 18 around a vertical axis defined by rod 41.

Plate 11 slides under fixing flanges 17 on base plate 18 and is locked in the position illustrated by locking assembly 20, which has a spring-extended manually retractable tenon 47 that advances behind a stop 49 (see FIG. 6), to keep movable plate 11 under fixing flanges 17 and immovable relative to the vehicle. Flanges 17 are provided on base plate 18 on the side remote from the vertical axis pivot assembly 25 and also adjacent to assembly 25.

From the stowed position (FIG. 1), ramp panels or sections 13 and 14 may be unlatched from vertical pivot assembly 25 via latch 28, and deployed downwardly, as illustrated in FIG. 2, to define a stepless ramp and thereby allow wheelchair access to the vehicle. Alternatively, the sections 13,14 can remain fixed to assembly 25, and movable plate 11 can be released by retracting tenon 47, whereupon the ramp sections 13 and 14, aligned vertically and connected as a unit with hinge 19 and plate 11, can be hinged outwardly away from base plate 18, around rod 41. Base plate 18 and rod 41 remain permanently in place fixed at the lower edge of the doorway. Ramp 10 is swung as a unit outwardly in the direction of arrow 22 to assume a position outside the vehicle as illustrated in phantom, opening the doorway for step-in access to the vehicle. It is also possible to arrange ramp 10 to swing inwardly for storage inside the vehicle but back from the doorway.

Figure 6:
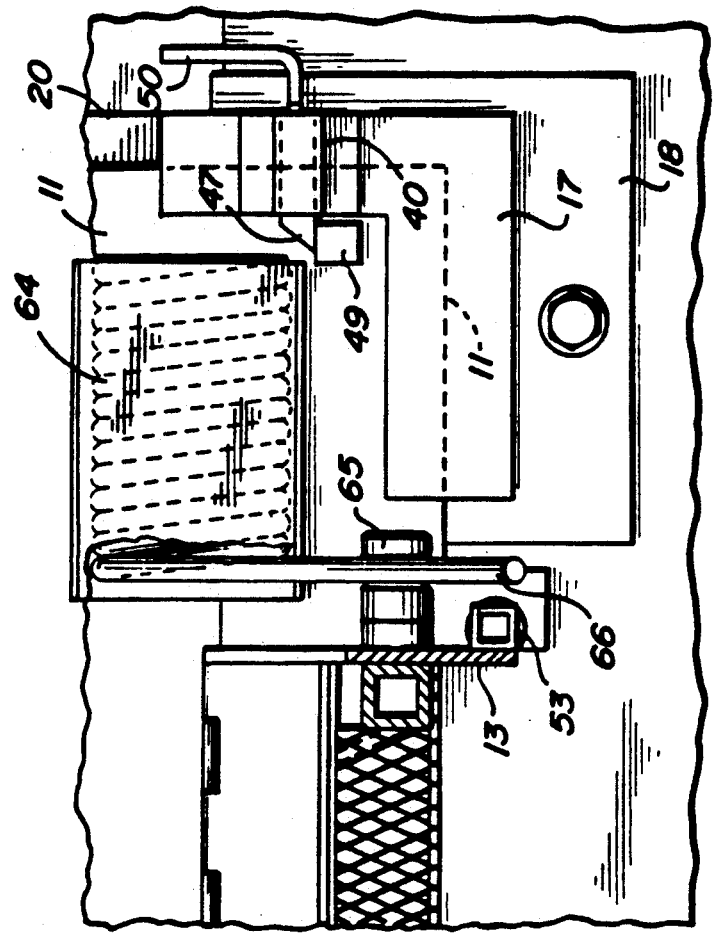
FIG. 6 is an enlarged detail of a locking mechanism for fixing the horizontal pivot axis at the lower edge of the doorway.

Ramp 10 is held to vertical pivot assembly 25 by the mating of releasable yoke 27 with a bolt 46 which extends from panel 13, and also by mating of latch 28 having handle 28a, to a second bolt 43 on panel 14. Yoke 27, with bolt 46, and latch 28, with bolt 43, keep ramp sections 13,14 from tilting away from tube 42 when the ramp is folded up but pivoted outwardly such that base plate 18 provides no support. The latch and yoke arrangements are better illustrated in FIGS. 2, 3 and 4. Locking assembly 20 and hinge mounting means 40 are best illustrated in FIGS. 5 and 6. Handles 26 on the sides 56,57 of panels 13,14 are provided for easy grasping of ramp 10 when moving or deploying the ramp panels 13 and 14. The handles can engage yoke 27 and/or latch 28 in lieu of bolts on the panel 13.

Adjustable bolt 29 (shown in FIGS. 2 and 3) adjusts the vertical positioning of panel 13 by adjustably urging stop 71 (welded to panel 13) outward until panel 13 is vertically parallel to post 42.

Figure 4:
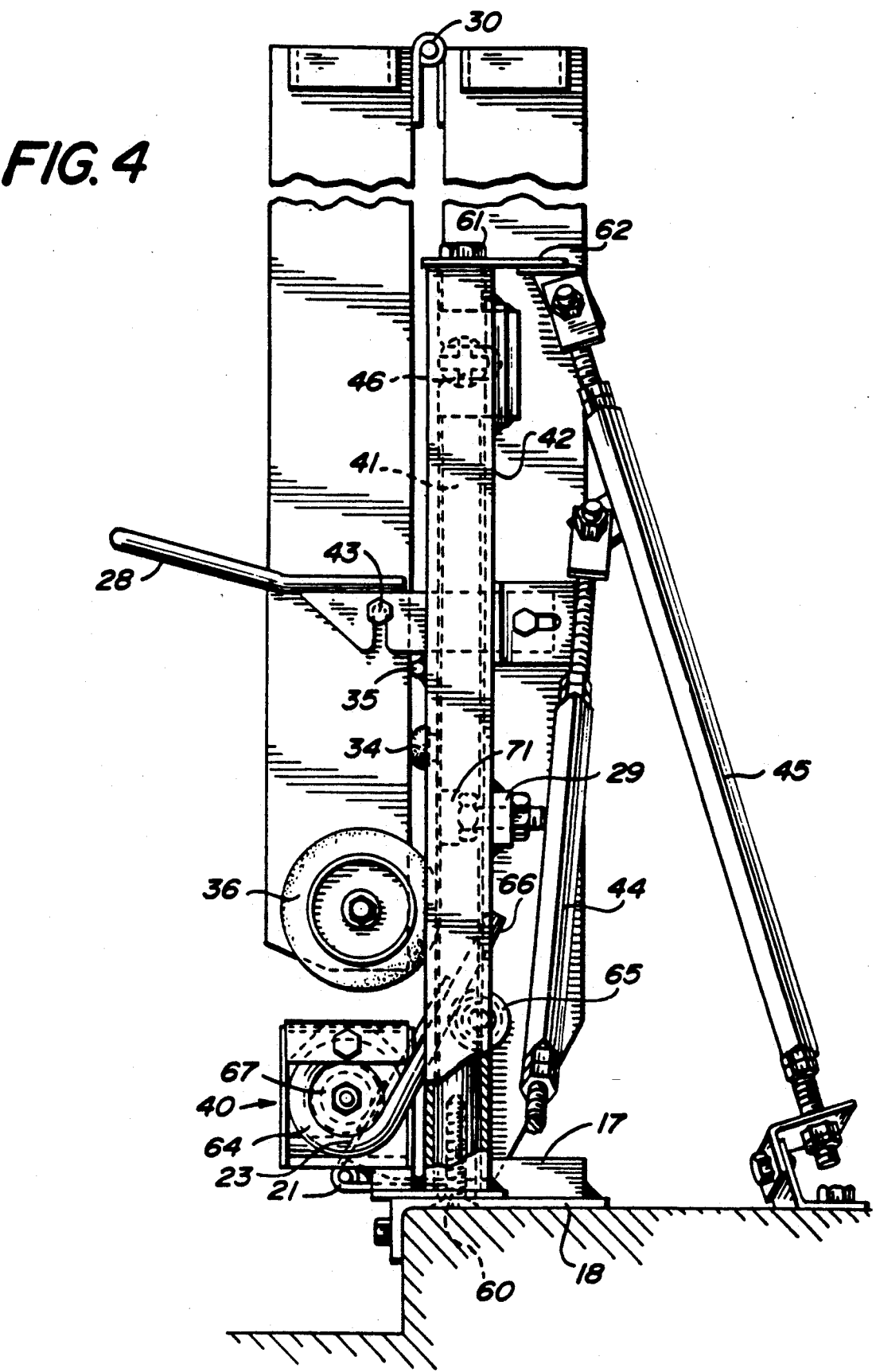
FIG. 4 is an enlarged side view of the assembly for providing a vertical pivot axis and the latch means for holding the ramp in the storage position.
Figure 5:
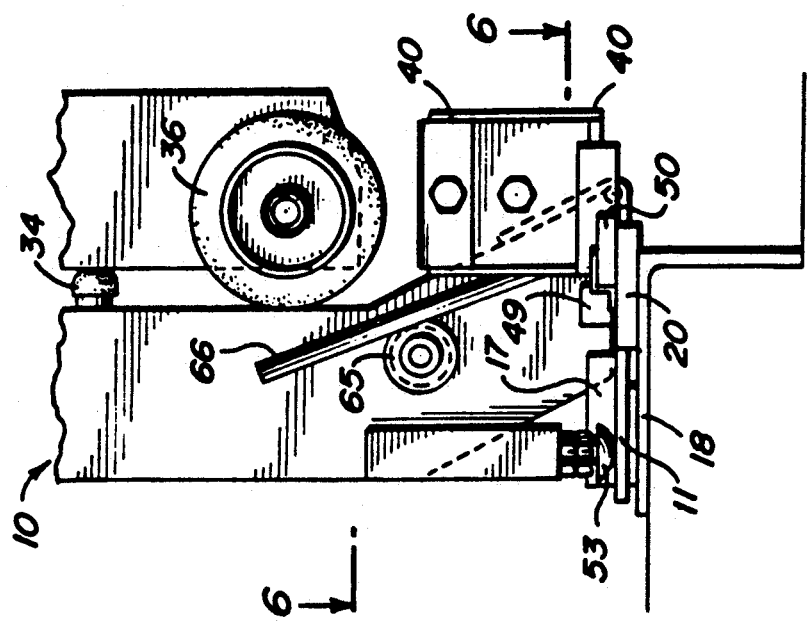
FIG. 5 is a detailed side elevation showing the spring and doorway.

Bolt 70, shown in FIG. 4, allows adjustment or operation of latch 28 (to engage bolt 43 on panel 14) such that panels 14,13 must be pressed tightly together (e.g. against a resilient spacer 34) when latch 28 locks. This prevents rattling of the parts and also keeps latch 28 from bouncing off bolt 43. When not resting on bolt 43, latch 28 rests on a welded-on stop 35, capturing bolt 43 when the ramp is again folded (see FIG. 4).

Panel 13 is securely fixed to the vehicle along its lower edge by engagement of flanges 17 on plate 11 adjacent hinge 19, plate 11 being kept under flanges 17 by means of the locking assembly 20 on one side and the vertical pivot assembly 25 on the other side. Accordingly, in this position, the ramp panels 13,14 are to some extent comparable with known ramps. In this position, panels 13,14 can be pivoted downwardly around hinge 19 as a unit, and also the two panels 13,14, can be pivoted away from one another around intermediate hinge axis 30. Hinge axis 30 defines a knuckle in that the hinge axis is at one side (the underside) of the two endwise abutting panels and, when the two panels 13,14 are unfolded, the ends of the panels adjacent the top side come against one another to block hinging past the point at which the panels 13,14 are aligned co-linearly. Accordingly, hinge 30 is connected as a knuckle arrangement allowing panels 13,14 to hinge only in one direction.

The distal end of the outermost panel 14 is provided with one or more rollers 36 that assist in deploying ramp 10. The roller allows the user to swing the ramp panels 13,14 down to the ground, and by allowing the roller to proceed away from the vehicle, permits panels 13,14 to become aligned.

Preferably, the mounting means 40 associated with rotation of hinge leaves 21,23 around hinge axis 19 is provided with a heavy duty spring biasing means 64 such as a large helical spring to overcome a substantial portion of the weight of panels 13,14 which otherwise must be carried by the user when deploying and/or stowing the ramp, most notably when folding the ramp back upwardly toward the vehicle. Springs at each end of axis 19, as shown in FIG. 6, bear against a stud extending from panel 13. Movable plate 11 and ramp section 13 are subjected to pressure from the springs. At the free end of plate 11, an adjustable bolt 53 on section 13 can be provided to press downwardly against plate 11 and compensate for warping of plate 11, due to spring pressure (See FIG. 5). In this manner, plate 11 remains parallel to base plate 18 and fits securely under flanges 17.

Latching means 20 at the end remote from vertical pivot assembly 25 is shown in FIGS. 5 and 6. Movable plate 11 has a stop 49 protruding upwardly. A preferably L-shaped flange 17 receives plate 11 sufficiently that stop 49 passes resiliently protruding tenon 47, whereupon plate 11 is captive between flange 17 and base plate 18. Handle 50 manually retracts tenon 47 to release plate 11.

A pair of attachment arms 44,45, including length-adjustable threaded rods and nuts (seen in FIG. 4), are used to mount the vertical pivot assembly 41,42 to the vehicle along members adjacent the doorway. Preferably, the support members are mounted between an upper end of rod 41, forming the stationary post of pivot assembly 25, and spaced points in the vehicle frame or body. The support members maintain the overall position of ramp 10 in the doorway of the vehicle while permitting occasional adjustments if necessary.

Referring to FIG. 2, a side view illustrates the deployed ramp panels or sections 13,14 pulled from the doorway in the direction of arrow 32. Base plate 18 is seen on doorway floor 16 to which base plate 18 is rigidly attached. Attached to plate 18 are the vertical pivot assembly 25 and, temporarily by virtue of plate 11 being locked under flanges 17 of plate 18, the spring biased mounting means 40. In order to release and deploy sections 13 and 14, latch 28 has been lifted from bolt 43, or other like structure protruding from the side 57 of panel 14 (not shown in FIG. 2) to release ramp member 14. At the distal end of ramp 14, roller 36 allows the ramp to roll out and also to adjust for uneven paving. To again stow ramp 10, handles 26 are lifted, whereupon roller 36 is moved back toward the vehicle, with spring mounts 40 urging panel 13 towards vertical. Seen on the underside of ramp panel 13 is shock absorbent bumper 34 which prevents ramp sections 13 and 14 from striking each other with too much force when folded back up for storage and also provides a resilient compressible spacer between sections 13,14 when section 13 is fixed by yoke 27 and bolt 46 (shown in FIG. 4), while section 14 is fixed by latch 28.

Now referring also to FIG. 3, vertical pivot assembly 25 is further illustrated. Rod 41 is fixed vertically to base plate 18 and with the base plate defines the basic support for ramp 10. Rod 41 carries pivoting sleeve 42, to which movable plate 11 is attached, e.g., by welding. However care must be taken to keep latch 28 closed when the sections 13,14 are swung into the access position, to avoid undue strain on the weld or the like. Movable plate 11 and support members 44 and 45 (shown in FIGS. 2 and 4) attach the distal end of rod 41 to the vehicle body such that rod 41 is securely fixed relative to the vehicle and relative to base plate 18. Sleeve 42, to which plate 11 and spring mounts 40 are attached (shown in FIG. 1), is rotatably received over rod 41 and pivots around the vertical axis of rod 41. On the exterior surface of sleeve 42 are means 27 and 29 for ramp panel 13 and also latch 28 for panel 14. Yoke 27 mates with a bolt or protrusion 46 on the side bar of ramp panel 13. Panel 14 is fixed to sleeve 42 via latch 28 and bears against bumper 34. Latch 28, which is liftable on a horizontal pivot via handle 28a, is movably attached to sleeve 42 and mates with bolt 43 or the like (shown in FIG. 4).

As shown in FIG. 4, the vertical rod 41 is attached to base plate 18 by means of a large flat-head machine screw 60, with a countersunk head, extending through base plate 18 from below and threaded into the shaft of rod 41. This bolt is the bottom means of support for rod 41. Extensible support members 44,45, as shown in FIG. 4, attach the top or distal end of rod 41 to points spaced inwardly on the vehicle from rod 41 and a second adjustable support 44 attaches to a point spaced laterally of the doorway. Support members 44,45 are preferably attached to rod 41 via a second bolt 61 threaded into rod 41 from above, and holding a short bracket 62 to which members 44,45 are attached. Preferably, members 44,45 are axially-threaded bars with threaded shafts lockable therein by means of one or more nuts which bear between the threaded shaft and the axially threaded bar. Bolts and brackets at either end of the bars attach directly to the vehicle body.

The adjustable bolt 29, bumper 34 and latch bolt 43 are a complementary arrangement which stabilizes the otherwise unfoldable ramp sections. The ramp panels 13,14 are forced against one another and spacer 34 tightly when stowing the ramp, bolt 70 set to allow bolt 43 to come within the grip of latch 28 when panels 13,14 are pressed together.

The spring biased mounting means 40 are shown in FIGS. 4-6. Mounts 40 include a heavy duty wound helical spring 64 with a protruding end segment 66 which bears upon a contact stud, preferably with a roller 65, on the inner panel 13 of ramp 10. The structure is best shown in FIGS. 4-6, wherein ramp 10 is shown stowed in its folded position. With reference to FIG. 4, when ramp 10 is deployed, the protruding spring segment is wound further around the spool 67 in spring mount 40 around which the helical spring is wrapped, which spring counters some of the weight of panels 13,14, particularly when these panels are rotated outwardly toward horizontal. The extent of spring pressure can be varied by the extent of winding of spring 64.

FIG. 4 also illustrates the latching mechanism 20 by which the side of ramp panels 13,14 remote from vertical pivot assembly 25, carried on movable plate 11, are fixed relative to base plate 18 for folding and unfolding of sections 13,14. The above-described latch mechanism is preferred. It is also possible to fix plate 11 to base plate 18 using a sliding pin fixed in one of base plate 18 and movable plate 11, which can be engaged in a corresponding receptacle in the other. In this manner, the hingeable portions of the ramp remain fixed to base plate 18 and thereby remain carried on the vehicle body via support members 44,45.

Ramp panels 13,14 are preferably made of an open work grid-like structure rather than out of solid sheet, the latter being unnecessarily heavy. Preferably panels 13,14 are provided with support members defining a box with one or more transverse or diagonally-oriented braces, the members being covered by a grid of expanded metal or the like.

The mounting for the ramp of the invention is subject to several adjustments whereby the hinging axes can be aligned for keeping the panels 13,14 stationary (when the vehicle is level) rather than prone to swing inwardly or outwardly. Members 44,45, respectively, allow the user to adjust for the pivot assembly rod 41 of assembly 25 to be precisely vertical. Should rod 41 lean from vertical outwardly of the vehicle, ramp panels 13,14 will tend to swing open. Should rod 41 lean transversely away from the edge of the doorway and toward the doorway opening, plate 11 will tend to bind against base plate 18. With correct adjustment, the ramps are stowed and deployed smoothly with little physical effort. Binding of plate 11 on base plate 18 due to spring-induced warping of plate 11 is overcome by adjustable bolt 53.

The invention as so described is a vehicle access ramp 10 with means 18 rigidly attachable in the vehicle doorway. A ramp member 12 is movably fixed to means 18 via a movable plate 11 and there are means for deploying ramp 12 by rotation from the doorway to the ground around a horizontal hinge axis 19. Ramp 12 pivots, together with the means for deploying, around a vertical axis provided by vertical pivot assembly 25. Ramp 12 includes two ramp sections 13,14 hinged at knuckle 30, each ramp section having proximal and distal ends and side bars 56,57. The proximal end of ramp 13 is attachable to plate 11 and the distal end of ramp section 13 is attached at hinge 30 to the proximal end of ramp section 14. Ramp section 14 also includes attachment means 43 which engage with locking means 28 for locking ramp 12 in a folded position.

The one or two sections 13,14 defining ramp member 12 are locked to the vehicle by latch member 20 which is attached via plate 11 to vertical pivot assembly 25 and by a latch-capturable element 49 to base plate 18.

Ramp 12 is pivoted on a vertical axis by means of vertical pivot assembly 25 which includes rod 41 attached perpendicularly to base plate 18 which is fixed in the vehicle doorway so that the rod extends upwardly from the vehicle floor at one side of the doorway. Assembly 25 is supported by members 44,45 which are attached to the vehicle at points remote from vertical pivot assembly 25. A hollow attachment sleeve 42 rotates on rod 41 and includes manually operable latch means 28 for holding ramp 12 to sleeve 42. Capturable means 43,46 on the ramp sections may be engaged by releasable latch means 28,27, holding ramp 12 to sleeve 42 and arranged in the stowed, folded position. A distal ramp section 14, connected to a proximal ramp section 13 may also include roller 36 at its distal end.

There are many advantages to the vehicle access ramp of this invention. Chiefly, the ramp has alternative pivots which permit it to be lowered to the ground for use and then to be folded and swung out of the way for storage.

Having now illustrated and described my invention, it is not intended that such description limit this invention, but rather that this invention be limited only by reasonable interpretation of the appended claims.

What is claimed is:

1. An access ramp for a vehicle doorway, comprising:
a plate rigidly attachable along a horizontal edge of the doorway;
a ramp including a proximal section and a distal section attached to one another at a hinge knuckle such that the proximal section and distal section are foldable in one direction at the hinge knuckle and become fixed in colinear alignment in an opposite direction when unfolded;
a hinge attached to the plate and to the proximal section of the ramp, the hinge defining a hinge axis along said edge of the doorway;
at least one spring biasing assembly having a housing rigidly attached to the plate and a helical spring disposed in the housing, the helical spring having a first end protruding along a first tangent of the helical spring and bearing against the proximal section of the ramp, and a second end protruding along a second tangent of the helical spring and bearing against one of the housing and the plate, the spring biasing assembly urging the proximal section of the ramp upwardly around the hinge axis and thereby biasing the ramp into a folded configuration in the vehicle doorway, the helical spring defining an axis parallel to the hinge axis and spaced from the hinge axis, and further comprising a contact stud including a roller on the proximal section of the ramp, the first end of the helical spring bearing against the proximal section of the ramp at the roller.

2. The access ramp according to claim 1, wherein the housing of the spring biasing assembly defines a box disposed on the plate, the second end of the helical spring bearing against an inner surface of the box.

3. The access ramp according to claim 2, further comprising a spool disposed in the helical spring, the spool being attached to the housing at least at one end of the housing.

4. The access ramp according to claim 2, comprising a helical spring and housing at both lateral sides of the proximal section of the ramp.

5. The access ramp according to claim 4, wherein the helical springs and housings at the lateral sides of the ramp are disposed laterally outside the proximal section of the ramp.

6. The access ramp according to claim 5, comprising contact studs and rollers at each lateral side of the proximal section of the ramp, said helical springs at the lateral sides each having a first end protruding to bear against a respective one of the rollers.

7. The access ramp according to claim 6, further comprising means for detaching the plate from the vehicle doorway, and a vertical pivot means attached to the plate at one of the lateral sides of the ramp, whereby the ramp can be rotated clear of the vehicle doorway around the vertical pivot means when the ramp is folded into the folded configuration.

8. The access ramp according to claim 7, further comprising a baseplate permanently attachable to the vehicle doorway and a baseplate latch on a lateral side of the ramp opposite from the vertical pivot means controllably operable to affix the plate to the baseplate and thereby position the ramp in the vehicle doorway.

9. The access ramp according to claim 6, further comprising a controllable ramp latch having interconnectable elements spaced from the hinge axis, the ramp latch being operable to affix the proximal and distal sections of the ramp to lock the ramp in the folded configuration.

10. The access ramp according to claim 8, wherein one of the plate and the baseplate has a movable pin and the other of the plate and the baseplate has a receptacle for the pin, the baseplate latch being operable by advancing and retracting the pin relative to the receptacle.

* * * * *